(12) United States Patent
Kishi et al.

(10) Patent No.: US 10,171,469 B2
(45) Date of Patent: ***Jan. 1, 2019

(54) INFORMATION PROCESSING SYSTEM, ACCESS METHOD, AND TERMINAL DEVICE

(71) Applicants: Hidenobu Kishi, Kanagawa (JP); Junko Nakano, Tokyo (JP); Tetsuya Ikeda, Tokyo (JP)

(72) Inventors: Hidenobu Kishi, Kanagawa (JP); Junko Nakano, Tokyo (JP); Tetsuya Ikeda, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 6 days.

This patent is subject to a terminal disclaimer.

(21) Appl. No.: 15/432,277

(22) Filed: Feb. 14, 2017

(65) Prior Publication Data

US 2017/0155656 A1 Jun. 1, 2017

Related U.S. Application Data

(63) Continuation of application No. 14/745,831, filed on Jun. 22, 2015, now Pat. No. 9,608,995.

(30) Foreign Application Priority Data

Jun. 27, 2014 (JP) ................................ 2014-132943

(51) Int. Cl.
*G06F 21/00* (2013.01)
*H04L 29/06* (2006.01)
(Continued)

(52) U.S. Cl.
CPC ........ *H04L 63/10* (2013.01); *G06F 17/30247* (2013.01); *G06F 17/30879* (2013.01);
(Continued)

(58) Field of Classification Search
CPC .......... G06F 21/30; G06F 21/44; G06F 21/45; G06F 21/50; G06F 21/62; G06F 21/606; G06F 21/608
See application file for complete search history.

(56) References Cited

U.S. PATENT DOCUMENTS

2003/0047613 A1  3/2003  Funamoto et al.
2004/0019792 A1  1/2004  Funamoto et al.
(Continued)

FOREIGN PATENT DOCUMENTS

CN  1987888 A  6/2007
JP  2009225268 A  10/2009
(Continued)

OTHER PUBLICATIONS

Kuo, David et al. "A 2D Barcode Validation System for Mobile Commerce." *Advances in Grid and Pervasive Computing* (2010): 150-161.
(Continued)

*Primary Examiner* — Edward Zee
(74) *Attorney, Agent, or Firm* — Harness, Dickey & Pierce, P.L.C.

(57) ABSTRACT

An system comprises: a first storage that stores access destination information, characteristic information, and first identification information in a manner associated with one another; a transmitter that transmits a captured image of a medium; a first-acquiring-unit that extracts the characteristic information and acquires the access destination information and the first identification information associated with the characteristic information, access based on the access destination information being controlled by an authentication device comprising a second storage that stores second identification information allocated to each medium, third identification information corresponding to the first identification information, and collation information indicating an access source in a manner associated with one another; a second-acquiring-unit that acquires fourth identification information allocated to each medium from the captured image; and an access unit that transmits the first identification information, the fourth identification information, and
(Continued)

the collation information when accessing an access destination indicated by the access destination information.

12 Claims, 9 Drawing Sheets

(51) Int. Cl.
   *G06F 21/30* (2013.01)
   *G06F 17/30* (2006.01)
   *G06F 21/44* (2013.01)
   *G06K 9/18* (2006.01)
   *H04W 12/06* (2009.01)

(52) U.S. Cl.
   CPC .............. *G06F 21/30* (2013.01); *G06F 21/44* (2013.01); *G06K 9/18* (2013.01); *H04L 63/08* (2013.01); *H04L 63/102* (2013.01); *H04W 12/06* (2013.01)

(56) References Cited

U.S. PATENT DOCUMENTS

| | | | |
|---|---|---|---|
| 2006/0097041 A1 | 5/2006 | Funamoto et al. | |
| 2009/0314838 A1* | 12/2009 | Kimura | G06K 1/123 235/469 |
| 2011/0085732 A1 | 4/2011 | Cheng | |
| 2012/0091202 A1 | 4/2012 | Cohen et al. | |
| 2013/0037608 A1 | 2/2013 | Evevsky | |
| 2014/0006435 A1 | 1/2014 | Kishi et al. | |
| 2014/0362235 A1 | 12/2014 | Kishi et al. | |
| 2015/0016675 A1 | 1/2015 | Kishi | |
| 2015/0215424 A1* | 7/2015 | Chun | H04L 67/32 709/217 |
| 2015/0334108 A1 | 11/2015 | Khalil et al. | |

FOREIGN PATENT DOCUMENTS

| | | |
|---|---|---|
| JP | 4859882 B2 | 1/2012 |
| JP | 2014010722 A | 1/2014 |
| JP | 2014238742 A | 12/2014 |
| JP | 2014238815 A | 12/2014 |
| JP | 2015018405 A | 1/2015 |
| JP | 2015038717 A | 2/2015 |

OTHER PUBLICATIONS

Extended European Search Report dated Nov. 13, 2015 issued in corresponding European Application No. 15173070.2.

* cited by examiner

FIG.2

| CHARACTERISTIC INFORMATION | URL | EVENT CODE |
|---|---|---|
| abc | http://1.example.org | EV0001 |
| efg | http://2.example.org | EV0231 |
| hij | http://3.example.org | EV1304 |
| ⋮ | ⋮ | ⋮ |

| EVENT CODE: XXX [EXPIRATION DATE] ||
|---|---|
| MEDIUM CODE | DEVICE ID |
| 0001 | (NOT REGISTERED) |
| 0002 | (NOT REGISTERED) |
| 0003 | AB01 |
| 0004 | CD03 |
| 0005 | (NOT REGISTERED) |
| 0006 | (NOT REGISTERED) |
| 0007 | EF05 |
| 0008 | (NOT REGISTERED) |
| ⋮ | ⋮ |

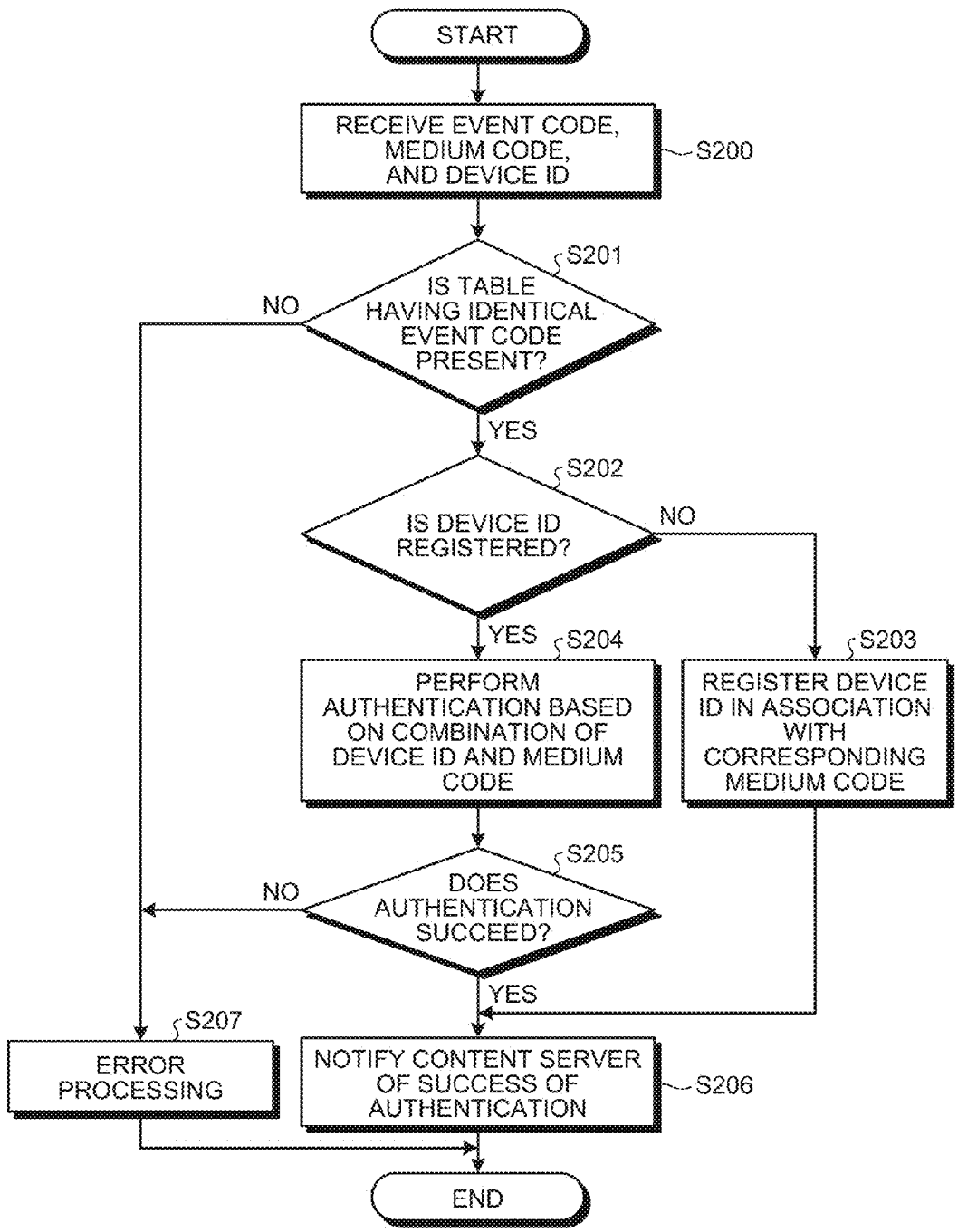

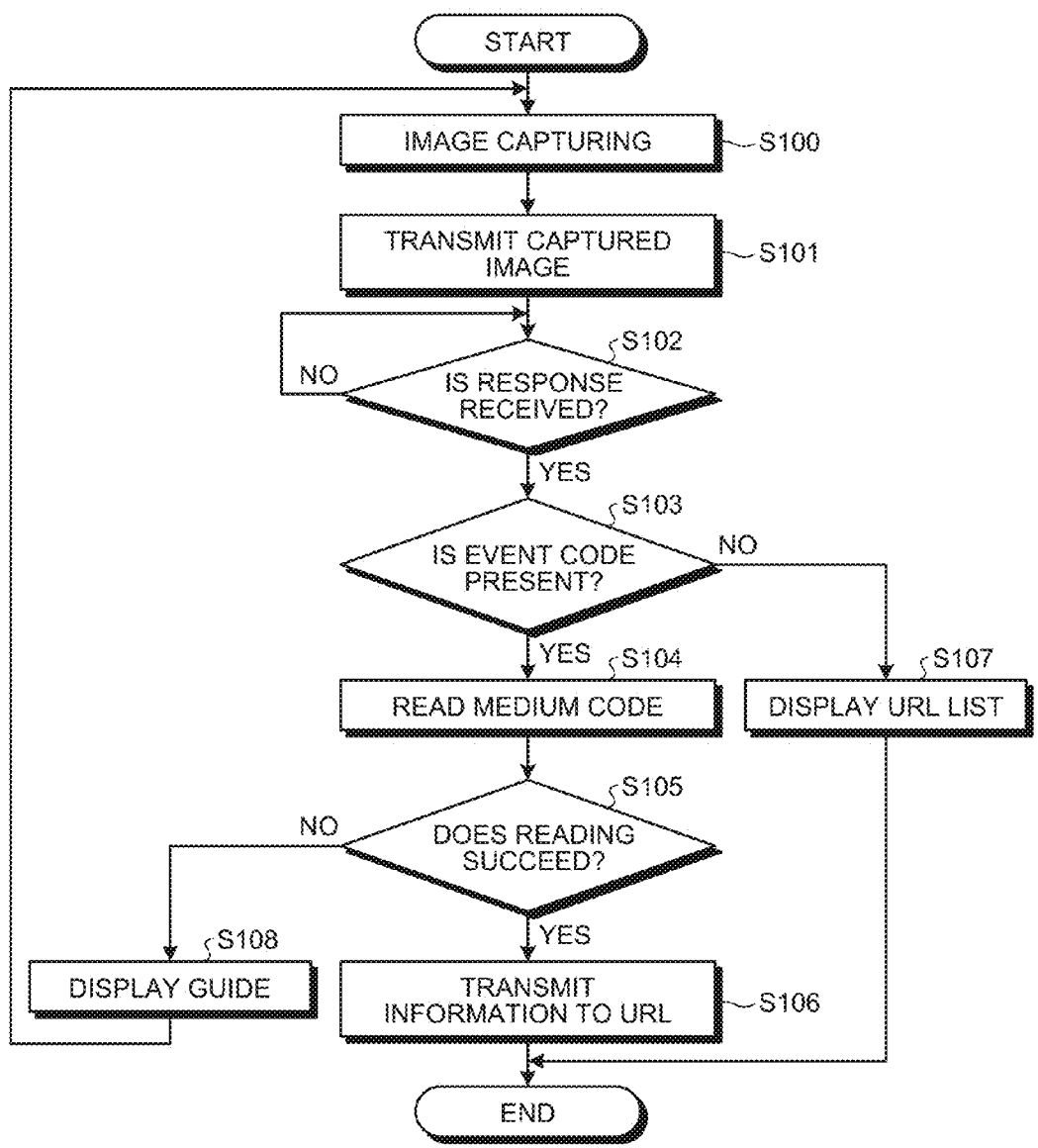

INFORMATION PROCESSING SYSTEM, ACCESS METHOD, AND TERMINAL DEVICE

CROSS-REFERENCE TO RELATED APPLICATION(S)

This application is a continuation application of U.S. application Ser. No. 14/745,831, filed on Jun. 22, 2015, which claims priority under 35 U.S.C. § 119(a) to Japanese Patent Application No. 2014-132943 filed in Japan on Jun. 27, 2014, the entire disclosures of each of which are hereby incorporated by reference herein.

BACKGROUND OF THE INVENTION

1. Field of the Invention

The present invention relates to an information processing system, an access method, and a terminal device.

2. Description of the Related Art

Recently widely used are technologies for enabling a user to access a website based on a uniform resource locator (URL) included in a two-dimensional code image, such as a QR code (registered trademark), obtained by encoding the URL of the website and printing it on a medium, for example. The user captures the two-dimensional code image on the printed matter, thereby decoding the URL. Two-dimensional code images can encode more pieces of information than one-dimensional code images, such as conventional bar codes, do.

Japanese Patent No. 4859882, for example, discloses a service that enables a user to acquire a content by: providing the user with a card on which a two-dimensional code image containing a card ID and a URL of a website is printed; and causing the user to access the website with the information printed on the card. When the user accesses the URL acquired from the two-dimensional code image, the technology described in Japanese Patent No. 4859882 transmits device-specific information of a mobile phone terminal used to acquire the two-dimensional code image to a server together with the card ID, thereby performing authentication. Thus, the technology prevents unauthorized use of the two-dimensional code image.

In the example of using the two-dimensional code, however, users other than the user who possesses the medium can access the website and acquire the content using the same medium.

This causes a problem especially in a case where the user acquires the medium by purchase. Simply by purchasing one medium on which the two-dimensional code image is printed, for example, a plurality of users can access the website and acquire the content based on the two-dimensional code image. This problem is not solved by the technology described in Japanese Patent No. 4859882.

In view of the problem described above, there is a need to facilitate provision of information based on an image on a medium in units of a user.

SUMMARY OF THE INVENTION

It is an object of the present invention to at least partially solve the problems in the conventional technology.

According to the present invention, there is provided an information processing system comprising: a first storage unit, at a retrieval device, configured to store therein access destination information, characteristic information, and first identification information in a manner associated with one another; an image transmitting unit, at a terminal device, configured to transmit a captured image obtained by capturing a medium; a first acquiring unit, at the retrieval device, configured to extract the characteristic information from the captured image and acquire the access destination information and the first identification information associated with the characteristic information from the first storage unit, access based on the access destination information being controlled by an authentication device that comprises a second storage unit that stores therein second identification information allocated to each medium, third identification information corresponding to the first identification information, and collation information indicating an access source in a manner associated with one another; a second acquiring unit, at the terminal device, configured to acquire fourth identification information allocated to each medium from the captured image; and an access unit, at the terminal device, configured to transmit the first identification information, the fourth identification information, and the collation information defining the terminal device as the access source when accessing an access destination indicated by the access destination information acquired by the first acquiring unit.

The present invention also provides an access method performed by a terminal device, the access method comprising: transmitting, by an image transmitting unit, a captured image obtained by capturing a medium to a retrieval device via a network, the retrieval device comprising a first storage unit configured to store therein access destination information, characteristic information, and first identification information in a manner associated with one another; acquiring, by a first acquiring unit, at the retrieval device, the access destination information and the first identification information specified based on the characteristic information of the transmitted captured image from the first storage unit, access based on the access destination information being controlled by an authentication device that comprises a second storage unit that stores therein second identification information allocated to each medium, third identification information corresponding to the first identification information, and collation information indicating an access source in a manner associated with one another; acquiring, by a second acquiring unit, fourth identification information allocated to each medium from the captured image; and transmitting, by an access unit, the first identification information, the fourth identification information, and the collation information defining the terminal device as the access source when accessing an access destination indicated by the access destination information acquired by the first acquiring unit.

The present invention also provides a terminal device comprising: a first acquiring unit configured to transmit a captured image obtained by capturing a medium and acquire access destination information and first identification information based on the transmitted captured image; a second acquiring unit configured to acquire fourth identification information allocated to each medium from the captured image; and an access unit configured to transmit the first identification information, the fourth identification information, and collation information when accessing an access destination indicated by the access destination information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram of an exemplary data structure of a database according to the embodiment;

FIG. 3 is a diagram of an exemplary data structure of a database according to the embodiment;

FIG. 7 is an exemplary flowchart of authentication performed by the authentication server according to the embodiment;

FIG. 8 is an exemplary flowchart for explaining an operation of the terminal device according to the embodiment;

DETAILED DESCRIPTION OF THE PREFERRED EMBODIMENTS

Exemplary embodiments of an information processing system, an access method, and a terminal device according to the present invention are described below in greater detail with reference to the accompanying drawings.

Embodiment

Figure 1:
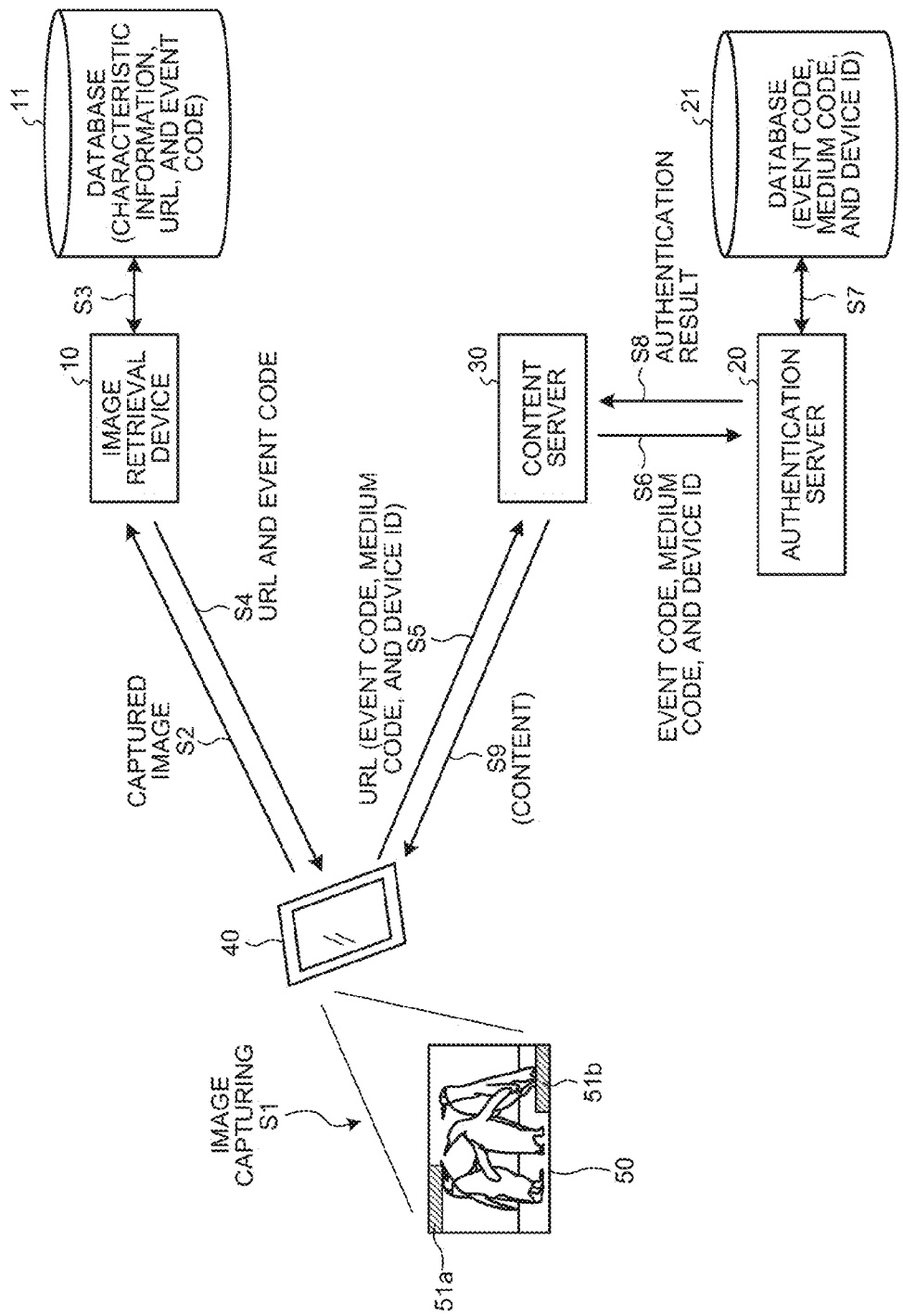
FIG. 1 is a diagram of an exemplary configuration of an information processing system according to an embodiment of the present invention.

FIG. 1 is a diagram of an exemplary configuration of an information processing system according to an embodiment of the present invention. As illustrated in FIG. 1, an information processing system 1 includes an image retrieval device 10, an authentication server 20, and a terminal device 40 that can communicate with one another via a network.

The terminal device 40 can be connected to the network, such as the Internet, in a wireless or wired manner. The terminal device 40 has an image-capturing function and can transmit a captured image obtained by capturing a subject to the network. The terminal device 40 may be a portably designed information processor having an image-capturing function, for example. Examples of the information processor include, but are not limited to, a multifunctional mobile phone terminal (smartphone) and a tablet computer.

The image retrieval device 10 is composed of one or more information processors and includes a database 11 serving as a first storage unit. The database 11 stores and registers therein characteristic information of an image, information indicating an access destination, and an event code serving as first identification information in a manner associated with one another. The image retrieval device 10 analyzes an image to extract characteristic information, thereby acquiring access destination information and an event code stored and registered in the database 11 in a manner associated with the extracted characteristic information. The image retrieval device 10 may be a retrieval device disclosed in Japanese Patent Application Laid-open No. 2014-10722, for example.

FIG. 2 is a diagram of an exemplary data structure of the database 11 according to the embodiment. In the example in FIG. 2, the characteristic information is registered in the database 11 as index data for information indicating characteristics, such as a characteristic point of an image. The access destination information may be a URL indicating a position on the network, for example.

The authentication server 20 includes a database 21 serving as a second storage unit. The database 21 stores and registers therein an event code serving as third identification information, a medium code serving as second identification information, and a device ID serving as collation information in a manner associated with one another.

FIG. 3 is a diagram of an exemplary data structure of the database 21 according to the embodiment. As illustrated in FIG. 3, a table 210 registers therein a plurality of medium codes in a manner associated with one event code. The database 21 stores therein data in units of the table 210. The event code registered in the database 21 corresponds to the event code registered in the database 11 illustrated in FIG. 2. The database 21 registers therein a plurality of tables 210 having respective event codes different from one another.

Medium codes associated with one event code each need to be unique, and an identical medium code may be shared by different event codes. An identical medium code, for example, may be associated with a first event code and a second event code different from each other.

Specifically, in a case where an identical medium code is used for different mediums, the event code serves as identification information for identifying the mediums. An identical medium code "001", for example, may be used for a medium relating to the first event code and a medium relating to the second event code. The event to which the medium code "001" is applied is identified by determining whether the event code associated with the medium having the medium code "001" is the first event code or the second event code.

More specifically, let us assume that the medium is a ticket, the first event code is associated with an event "movie XX", and the second event code is associated with an event "concert of a singer YY", for example. In this case, an identical medium code may be used for a ticket of the "movie XX" and a ticket of the "concert of a singer YY". Based on the event code associated with the medium code, it is possible to determine whether the medium code is associated with the event "movie XX" or the event "concert of a singer YY".

The device ID illustrated in FIG. 3 is used to authenticate information transmitted from the terminal device 40. The device ID corresponding to a terminal device 40 authentication of which succeeds by the authentication server 20 out of terminal devices 40 is registered in the database 21 in a manner associated with the medium code transmitted from the terminal device 40, which will be described later in detail. In other words, immediately after the creation of the table 210 relating to one event code, no device ID is associated with all the medium codes in the table 210.

In the table 210, an expiration date may be set for the event code. The authentication server 20, for example, invalidates information registered in a table 210 having an expired event code out of tables 210 registered in the database 21.

The information processing system 1 uses a medium 50. The medium 50 may be a card having the same size as that of a cash card, for example, and on which printing can be performed. The medium 50 includes an image the characteristic information of which is registered in the database 11 in advance. The medium 50 further includes, at predetermined positions, medium code images 51a and 51b indicating a medium code registered in the database 21 in advance.

In the example illustrated in FIG. 1, the medium code images 51a and 51b are arranged at a pair of opposite corners on the rectangular medium 50. The arrangement of the medium code images 51a and 51b in this manner enables the image retrieval device 10 to determine an image area from which the characteristic information is to be extracted on the medium 50 based on the medium code images 51a and 51b. The medium code images 51a and 51b may indicate the same medium code or indicate a single medium code in combination.

The format of the medium code image is not particularly limited as long as the medium code can be read from the image. The medium code image may be Colorbit (registered trademark) developed by B.CORE Inc. in Japan, for example. The medium code image is not limited thereto and may be a bar code or a character string indicating the medium code.

A content server 30 illustrated in FIG. 1 manages contents, such as images and video. The access destination information registered in the database 11 is a URL indicating a position, on the network, of a content managed by the content server 30, for example.

Figure 4:
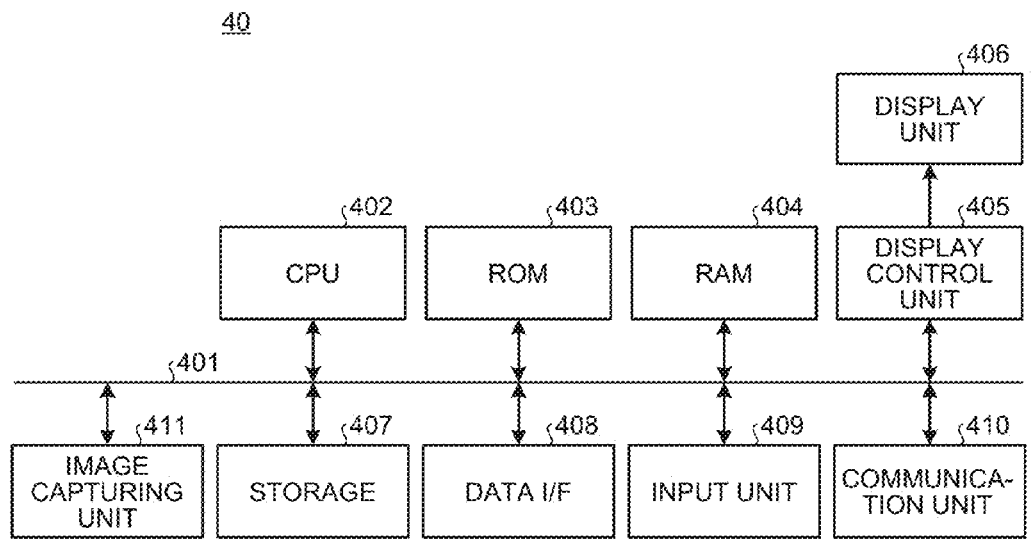
FIG. 4 is a block diagram of an exemplary configuration of hardware of a terminal device applicable to the embodiment.

FIG. 4 is a block diagram of an exemplary configuration of hardware of the terminal device 40 applicable to the embodiment. As illustrated in FIG. 4, the terminal device 40 includes a central processing unit (CPU) 402, a read only memory (ROM) 403, a random access memory (RAM) 404, and a display control unit 405 connected to a bus 401. The terminal device 40 further includes a storage 407, a data interface (I/F) 408, an input unit 409, a communication unit 410, and an image capturing unit 411 connected to the bus 401. The storage 407 is a storage medium that can store therein data in a non-volatile manner and is a non-volatile semiconductor memory, such as a flash memory. The storage 407 is not limited thereto and may be a hard disk drive.

The CPU 402 collectively controls the terminal device 40 in accordance with computer programs stored in the ROM 403 and the storage 407 using the RAM 404 as a work memory. The display control unit 405 converts a display control signal generated by the CPU 402 into a signal in a format displayable by a display unit 406 and outputs the signal.

The storage 407 stores therein the computer programs executed by the CPU 402 and various types of data. The storage 407 and the ROM 403 may be a single rewritable non-volatile semiconductor memory, for example. The data I/F 408 receives and transmits data from and to an external device. The data I/F 408 may be an interface of universal serial bus (USB) or Bluetooth (registered trademark), for example.

The display control unit 405 drives the display unit 406 based on the display control signal generated by the CPU 402. The display unit 406 includes a liquid-crystal display (LCD), for example, and is driven by the display control unit 405 to perform display based on the display control signal.

The input unit 409 includes an input device that receives an input from a user. The user, for example, operates the input device based on the display on the display unit 406, thereby issuing an instruction to the terminal device 40. The input device that receives an input from the user is preferably provided as a touch panel integrated with the display unit 406 to output a control signal depending on a pressed position and transmit an image on the display unit 406.

The communication unit 410 includes a communication I/F that performs wireless communications via the network under the control of the CPU 402.

The image capturing unit 411 includes an optical system, an image capturing element, and a control drive circuit for the optical system and the image capturing element. The image capturing unit 411 performs predetermined processing on an image capturing signal output from the image capturing element and outputs the signal as a digital signal of a captured image. The image capturing unit 411 performs image capturing, zooming-up, and other functions based on an instruction issued by an operation performed by the user on the input unit 409. The captured image output from the image capturing unit 411 is transmitted to the CPU 402 via the bus 401 and subjected to predetermined image processing in accordance with a computer program. The captured image output from the image capturing unit 411 and subjected to the image processing is stored in the storage 407, for example. The CPU 402 reads the captured image from the storage 407 and causes the communication unit 410 to transmit the image to the network.

Figure 5:
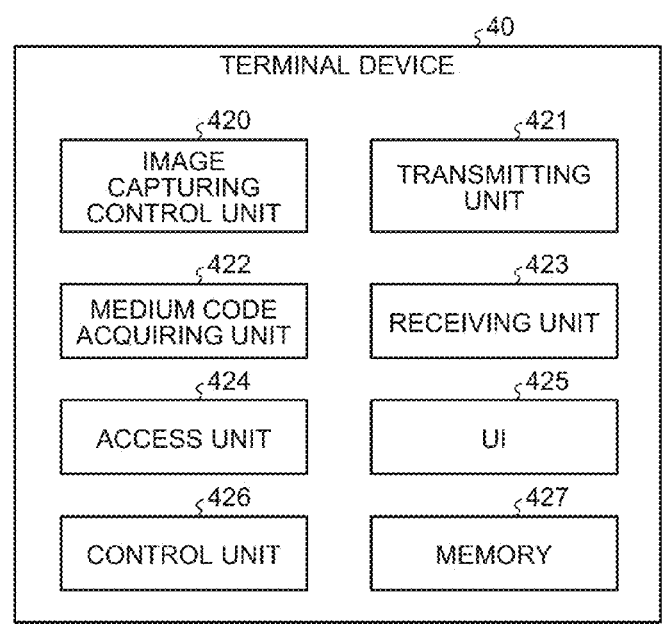
FIG. 5 is an exemplary functional block diagram for explaining functions of the terminal device according to the embodiment.

FIG. 5 is an exemplary functional block diagram for explaining functions of the terminal device 40 according to the embodiment. The terminal device 40 includes an image capturing control unit 420, a transmitting unit 421, a medium code acquiring unit 422, a receiving unit 423, an access unit 424, a user interface (UI) 425, a control unit 426, and a memory 427.

The control unit 426 acquires the state of each unit, that is, of the image capturing control unit 420, the transmitting unit 421, the medium code acquiring unit 422, the receiving unit 423, the access unit 424, the UI 425, and the memory 427. The control unit 426 issues an instruction to each unit, thereby collectively controlling an operation of the terminal device 40.

The image capturing control unit 420, the transmitting unit 421, the medium code acquiring unit 422, the receiving unit 423, the access unit 424, the UI 425, and the control unit 426 are provided by the CPU 402 executing a computer program thereon. The configuration is not limited thereto, and a part or all of the image capturing control unit 420, the transmitting unit 421, the medium code acquiring unit 422, the receiving unit 423, the access unit 424, the UI 425, and the control unit 426 may be provided as hardware that cooperates with one another. The memory 427 corresponds to a storage area in the storage 407, for example.

The image capturing control unit 420 controls the operation of the image capturing unit 411 illustrated in FIG. 4 in response to an instruction from the control unit 426, thereby acquiring a captured image. The transmitting unit 421 controls the communication unit 410 to transmit information via the network. The medium code acquiring unit 422 analyzes the captured image acquired by the image capturing control unit 420 to detect a medium code image, thereby acquiring a medium code from the detected medium code image. The receiving unit 423 controls the communication unit 410 to receive information transmitted via the network. The access unit 424 controls the communication unit 410 to access a specified URL.

The UI 425 receives an input to the input unit 409 from the user. The UI 425 controls a display screen displayed on the display unit 406. The memory 427 stores therein a device ID in a non-volatile manner.

The device ID will be schematically described. The device ID is generated by application software according to the embodiment (hereinafter, simply referred to as a terminal application) when the terminal application is installed in the terminal device 40. The terminal application uses random numbers, for example, thereby generating the device ID as a unique value. When the terminal application is deleted from the terminal device 40, the device ID is also deleted. The method for generating the device ID is not limited thereto. Alternatively, in a case where the terminal application is downloaded from a server device on the network and installed in the terminal device 40, the device ID may be generated by the server device and transmitted to the terminal device 40 together with the terminal application, for example.

The device ID is not limited thereto and may be a value unique to the terminal device 40, such as a media access control (MAC) address. Alternatively, the device ID may be another value unique to the user of the terminal device 40, such as a phone number of the user.

The image capturing control unit 420, the transmitting unit 421, the medium code acquiring unit 422, the receiving unit 423, the access unit 424, the UI 425, and the control unit 426 are provided by the terminal application program (terminal application) operating on the CPU 402. The terminal application is stored in a computer connected to the network with which the communication unit 410 can communicate and is provided by being downloaded via the network. Alternatively, the terminal application may be provided or distributed via the network.

The embodiment is not limited thereto, and the terminal application may be recorded and provided in a computer-readable recording medium, such as a compact disc (CD) and a digital versatile disc (DVD), as an installable or executable file. In this case, the terminal application is provided to the terminal device 40 via an external drive device or an external computer connected to the data I/F 408, for example.

The embodiment is not limited thereto, and the terminal application may be embedded and provided in the ROM 403 or the storage 407 in advance.

The terminal application has a module configuration including each unit described above (the image capturing control unit 420, the transmitting unit 421, the medium code acquiring unit 422, the receiving unit 423, the access unit 424, the UI 425, and the control unit 426), for example. In actual hardware, the CPU 402 reads and executes the terminal application from the storage 407, for example, to load each unit on the main memory (e.g., the RAM 404). Thus, each unit is generated on the main memory.

Figure 6:
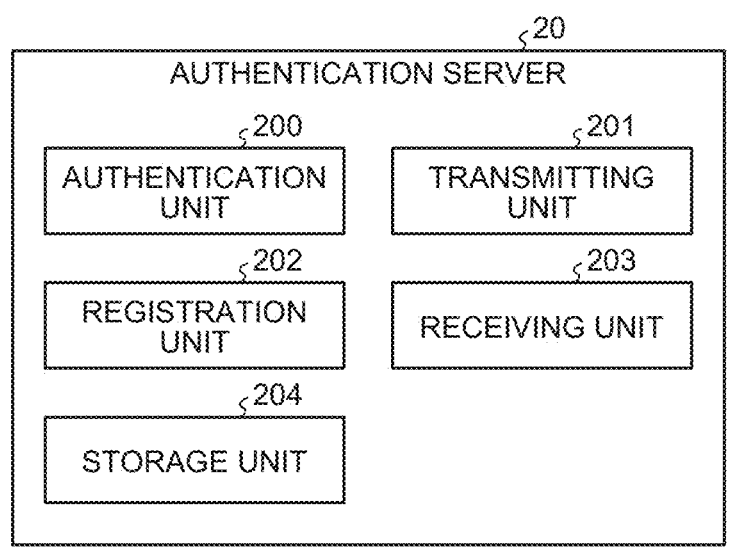
FIG. 6 is an exemplary functional block diagram for explaining functions of an authentication server according to the embodiment.

FIG. 6 is an exemplary functional block diagram for explaining functions of the authentication server 20 according to the embodiment. As illustrated in FIG. 6, the authentication server 20 includes an authentication unit 200, a transmitting unit 201, a registration unit 202, a receiving unit 203, and a storage unit 204. The storage unit 204 corresponds to the database 21.

The receiving unit 203 receives identification information transmitted from the terminal device 40 and to be used for authentication. The authentication unit 200 refers to the database 21 based on the identification information received by the receiving unit 203 to authenticate the terminal device 40. The transmitting unit 201 transmits the authentication result of the terminal device 40. The registration unit 202 registers the information on the terminal device 40 in the database 21.

Because the authentication server 20 and the image retrieval device 10 have the same configuration as that of a typical computer in which a CPU, a ROM, a RAM, a storage, and various types of interfaces are connected via a bus, detailed explanation thereof will be omitted.

Operation According to the Embodiment

The following describes an operation of the information processing system according to the embodiment having the configuration described above with reference to FIG. 1. The user starts the terminal application in the terminal device 40 and captures the medium 50 to acquire a captured image (Step S1). The terminal device 40 transmits the acquired captured image to the image retrieval device 10 (Step S2). The image retrieval device 10 analyzes the captured image transmitted from the terminal device 40 to extract characteristic information and refers to the database 11 based on the extracted characteristic information, thereby acquiring access destination information (URL) and an event code registered in a manner associated with the characteristic information (Step S3). The image retrieval device 10 transmits the acquired access destination information and the acquired event code to the terminal device 40 (Step S4).

If the terminal device 40 receives the access destination information and the event code from the image retrieval device 10, the terminal device 40 analyzes the captured image acquired at Step S1 to extract the medium code images 51a and 51b, thereby acquiring the medium code (fourth identification information) indicated by the medium code images 51a and 51b. The terminal device 40 transmits the acquired medium code, the device ID of the terminal device 40, and the event code received from the image retrieval device 10 at Step S4 to the access destination indicated by the access destination information (URL) transmitted from the image retrieval device 10 at Step S4 (Step S5). Let us assume that the access destination indicated by the access destination information is a predetermined content managed by the content server 30.

The content server 30 transmits the event code, the medium code, and the device ID transmitted from the terminal device 40 to the authentication server 20 without any change (Step S6). Based on the event code, the medium code, and the device ID received from the terminal device 40 via the content server 30, the authentication server 20 refers to the table 210 corresponding to the event code and registered in the database 21, thereby performing authentication on the terminal device 40 (Step S7). If the authentication succeeds, the terminal device 40 is allowed to access the access destination indicated by the access destination information, that is, the URL indicated by the access destination information and managed by the content server 30.

FIG. 7 is an exemplary flowchart of authentication performed by the authentication server 20 according to the embodiment. At Step S200, the receiving unit 203 of the authentication server 20 receives the event code, the medium code, and the device ID transmitted from the terminal device 40 to the content server 30 and then transferred from the content server 30 to the authentication server 20. At Step S201, the authentication unit 200 of the authentication server 20 refers to the database 21, thereby determining whether the table 210 having an event code identical to the event code received at Step S200 is registered (first determination).

If the authentication unit 200 determines that the table 210 is not registered at Step S201, the authentication unit 200 performs the processing at Step S207 to perform error processing and terminates the authentication. In this case, the terminal device 40 fails to acquire the content indicated by the access destination information.

If the authentication unit 200 determines that the table 210 having an event code identical to the event code received at Step S200 is registered at Step S201, the authentication unit 200 specifies the table 210 and then performs the processing at Step S202. At Step S202, the authentication unit 200 determines whether a device ID identical to the device ID received at Step S200 is registered in the table 210 specified at Step S201 (second determination).

If the authentication unit 200 determines that the device ID is not registered at Step S202, the process proceeds to Step S203. At Step S203, the registration unit 202 of the authentication server 20 registers the device ID in the specified table 210 based on the event code, the medium code, and the device ID received at Step S200. More specifically, the registration unit 202 specifies a medium code identical to the medium code received at Step S200 and registered in the table 210 specified at Step S201. The registration unit 202 then registers the device ID in the table 210 in a manner associated with the specified medium code.

If the registration of the device ID in the database 21 is completed at Step S203, the authentication server 20 performs the processing at Step S206, which will be described later.

If the authentication unit 200 determines, at Step S202, that a device ID identical to the device ID received at Step S200 is registered in the table 210 specified at Step S201, the authentication unit 200 performs the processing at Step S204. At Step S204, the authentication unit 200 performs authentication on the terminal device 40 based on the combination of the device ID and the medium code. At Step S205, the authentication unit 200 determines whether or not the authentication succeeds.

More specifically, the authentication unit 200 determines, at Step S204 and Step S205, whether a pair of a device ID and a medium code identical to the pair of the device ID and the medium code received at Step S200 is registered in the specified table 210. If the authentication unit 200 determines that an identical pair of a device ID and a medium code is registered in the table 210, the authentication unit 200 determines that the authentication succeeds, and the process proceeds to Step S206.

At Step S206, the transmitting unit 201 of the authentication server 20 notifies the content server 30 that the authentication of the terminal device 40 succeeds. If the content server 30 is notified of the success of the authentication, the series of processing illustrated in the flowchart in FIG. 7 is terminated.

By contrast, if the authentication unit 200 determines that the authentication fails at Step S205, the authentication server 20 performs the processing at Step S207 to perform error processing and then terminates the series of processing illustrated in the flowchart in FIG. 7.

The following describes a pair of a medium code and a device ID registered in the specified table 210 and a pair of a received medium code identical to the registered medium code and a received device ID, for example. In a case where the device ID on the table 210 is different from the received device ID, one medium 50 may have possibly been captured by a plurality of terminal devices 40. In this case, the authentication fails. In the embodiment, one medium code associated with a certain event code is associated only with one device ID.

Referring back to FIG. 1, if the authentication of the terminal device 40 succeeds, the authentication server 20 notifies the content server 30 of the fact in accordance with the processing at Step S206 (Step S8). In response to the notification of the success of the authentication, for example, the content server 30 permits access of the terminal device 40 to the content indicated by the access destination information and managed by the content server 30. Thus, the terminal device 40 can acquire the content indicated by the access destination information (Step S9).

If the authentication of the terminal device 40 performed by the authentication server 20 fails, the authentication server 20, for example, notifies the content server 30 of the fact. In response to the notification of the failure of the authentication, the content server 30 denies access of the terminal device 40 to the content indicated by the access destination information.

As described above, the information processing system 1 according to the embodiment authenticates the terminal device 40 using the image on the medium 50 common to a plurality of mediums 50, the medium code unique to each medium 50, and the device ID unique to the terminal device 40. Thus, the information processing system 1 according to the embodiment can manage the medium 50 for each terminal device 40.

With the information processing system 1 according to the embodiment, the user can be provided with a content exclusive to a purchaser of the medium 50 simply by capturing the purchased medium 50 with his/her terminal device 40.

To acquire the access destination information, the embodiment needs to access the image retrieval device 10. Thus, the information processing system 1 according to the embodiment makes "spoofing" difficult compared with a case where the access destination information is embedded in a two-dimensional code image, for example.

The following describes the operation of the terminal device 40 from Step S1 to Step S5 in FIG. 1 in greater detail with reference to the flowchart in FIG. 8. At step S100, the image capturing control unit 420 of the terminal device 40 captures the medium 50 in response to an operation performed by the user on the UI 425 (Step S1 in FIG. 1). The display unit 406 displays an image to be captured by the image capturing unit 411 in a manner updated in a frame period, for example. The user, for example, performs image capturing while referring to the image displayed on the display unit 406 to adjust an angle of view.

At Step S101, the transmitting unit 421 of the terminal device 40 transmits the captured image including the image of the medium 50, which is acquired at Step S100, to the image retrieval device 10 (Step S2 in FIG. 1). At Step S102, the terminal device 40 determines whether the receiving unit 423 receives a response from the image retrieval device 10. If the terminal device 40 determines that the receiving unit 423 receives no response from the image retrieval device 10, the terminal device 40 performs the processing at Step S102 again.

If the terminal device 40 determines that the receiving unit 423 receives a response from the image retrieval device 10 at Step S102, the terminal device 40 performs the processing at Step S103. The response from the image retrieval device 10 includes at least access destination information (URL) corresponding to the captured image. At Step S103, the control unit 426 of the terminal device 40 determines whether the response received at Step S102 includes an event code. If the control unit 426 determines that the response includes no event code, the control unit 426 performs the processing at Step S107.

At Step S107, the control unit 426 controls the UI 425 to display, on the display unit 406, a list of the access destination information included in the response received at Step S102. Subsequently, the series of processing illustrated in the flowchart in FIG. 8 is terminated. If a piece of access destination information is selected by an operation performed by the user from the list displayed on the display unit 406, the access unit 424 accesses the access destination indicated by the selected access destination information, thereby acquiring a content, for example.

By contrast, if the control unit 426 determines, at Step S103, that the response received at Step S102 includes an event code, the control unit 426 performs the processing at Step S104. At Step S104, the control unit 426 requests the medium code acquiring unit 422 to read a medium code from the captured image acquired at Step S100. In response to the request, the medium code acquiring unit 422 analyzes the captured image acquired at Step S100 to extract the medium code images 51a and 51b from the captured image and reads a medium code from the extracted medium code images 51a and 51b.

At Step S105, the control unit 426 determines whether or not the reading of the medium code performed by the medium code acquiring unit 422 at Step S104 succeeds. If the control unit 426 determines that the reading of the medium code succeeds, the process proceeds to Step S106. At Step S106, the access unit 424 accesses the access destination indicated by the access destination information included in the response received at Step S102 and transmits the event code included in the response, the medium code read by the medium code acquiring unit 422 at Step S104, and the device ID of the terminal device 40 to the access destination (Step S5 in FIG. 1).

If the control unit 426 determines that the reading of the medium code fails at Step S105, the control unit 426 performs the processing at Step S108. At Step S108, the control unit 426 causes the UI 425 to display a guide image on the display unit 406. The guide image facilitates the arrangement of the medium code images 51a and 51b in the captured image. If the guide display is displayed on the display unit 406, the control unit 426 performs the processing at Step S100 again and urges the user to perform image capturing again.

Figure 9A:
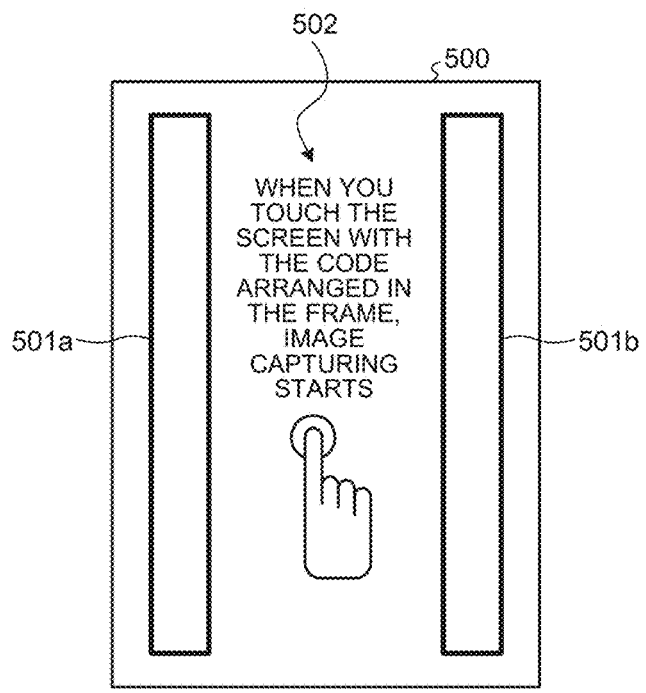
FIGS. 9A and 9B are schematics of an example of a guide image according to the embodiment.
Figure 9B:
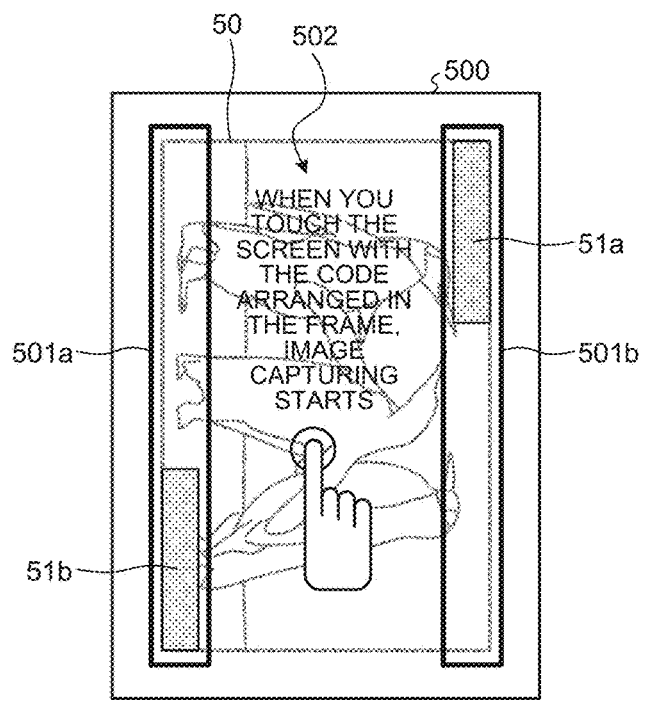

FIGS. 9A and 9B are schematics of an example of the guide image according to the embodiment. As illustrated in FIG. 9A, the guide image includes frame images 501a and 501b and message display 502 in a capturing area 500. The message display 502 is a message for urging the user to determine an angle of view such that the medium code images 51a and 51b are arranged in the frame images 501b and 501a, respectively, for example.

The frame images 501a and 501b and the message display 502 are superimposed on the captured image output from the image capturing unit 411. The frame images 501a and 501b corresponds to the positions of the medium code images 51b and 51a, respectively. As illustrated in FIG. 9B, the angle of view is determined such that the medium code images 51a and 51b are arranged inside the frame images 501b and 501a, respectively. This mechanism can capture the medium 50 in an appropriate size in the capturing area 500 and more reliably acquire the medium code images 51a and 51b.

Producing System of the Medium

Figure 10:
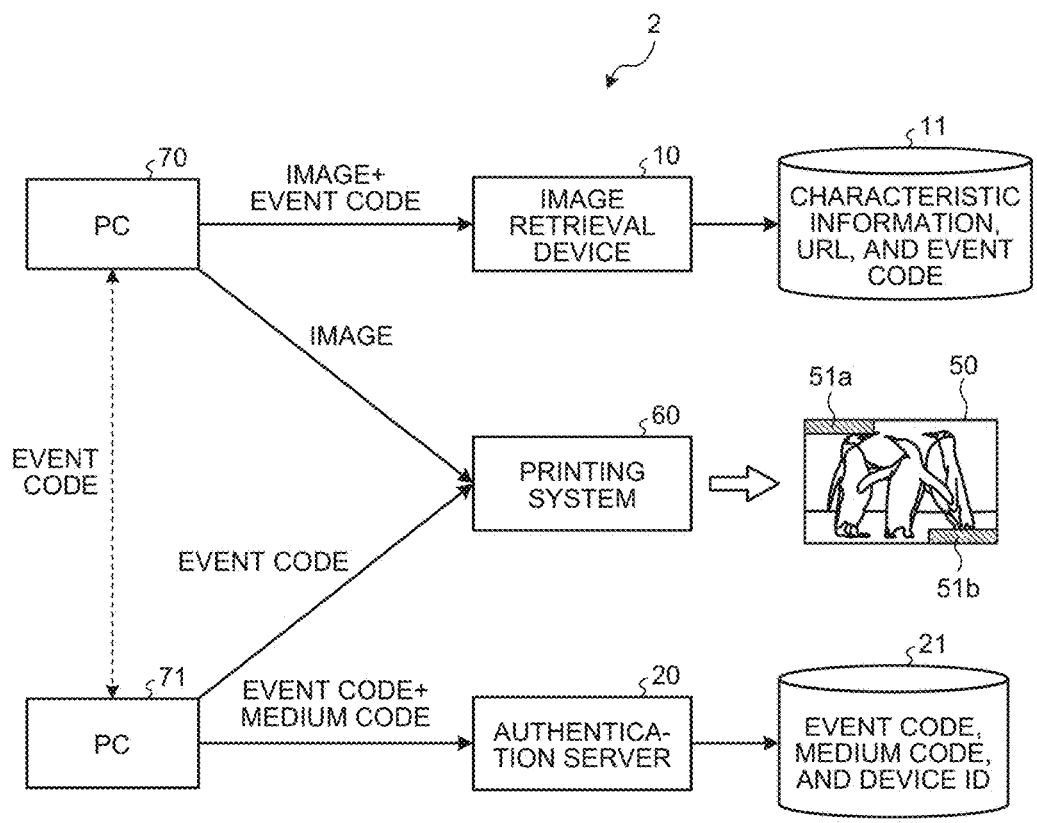
FIG. 10 is a block diagram schematically illustrating an exemplary configuration of a producing system that produces a medium according to the embodiment.

A producing system that produces the medium 50 will be schematically described. The following describes a case where the medium 50 is produced by printing. FIG. 10 is a block diagram schematically illustrating an exemplary configuration of the producing system that produces the medium 50 according to the embodiment. In FIG. 10, the same components as those in FIG. 1 are denoted by like reference numerals, and detailed explanation thereof will be omitted.

As illustrated in FIG. 10, a producing system 2 includes one or more computers (PCs) 70 and 71 and a printing system 60. In the example in FIG. 10, the PC 70 is connected to the image retrieval device 10, and the PC 71 is connected to the authentication server 20. The configuration is not limited thereto, and the functions of the PCs 70 and 71 may be integrated in one PC. Because the configuration of the PCs 70 and 71 is the same as that of a typical computer, explanation thereof will be omitted.

Figure 11:
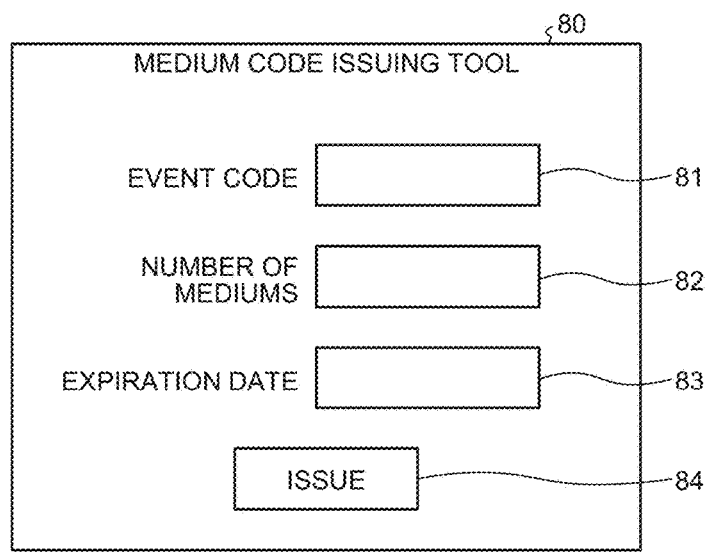
FIG. 11 is a schematic of an example of a medium code issuing screen of a medium code issuing tool according to the embodiment.

The PC 71 generates an event code and one or more medium codes associated with the event code in accordance with a computer program executed by the PC 71. The PC 71 then transmits the event code and one or more medium codes to the authentication server 20. FIG. 11 illustrates an example of a medium code issuing screen of a medium code issuing tool according to the embodiment. The medium code issuing tool corresponds to the computer program executed by the PC 71 to generate the event code and one or more medium codes. As illustrated in FIG. 11, a medium code issuing screen 80 includes an event code input portion 81, a medium number input portion 82, an expiration date input portion 83, and an issuing button 84.

The event code input portion 81 is an input portion that receives an event code. It is necessary for the event code to have a value not identical to that of an event code in the table 210 already registered in the database 21. The medium code issuing tool, for example, may generate a value not identical to that of an existing event code using random numbers and input the value to the event code input portion 81. The medium code issuing tool may inquire of the authentication server 20 to acquire the event codes described in the respective tables 210 registered in the database 21. When the event code input portion 81 receives a value identical to one of the acquired event codes, the medium code issuing tool may issue a warning.

The medium number input portion 82 is an input portion that receives the number of mediums 50 to be issued for the event code input to the event code input portion 81. The medium code issuing tool, for example, generates medium codes for the number of mediums input to the medium number input portion 82. The format of the medium codes is not particularly limited as long as the medium codes associated with one event code are not identical to one another and a medium code image can be generated therefrom. The medium codes may be sequential numbers or be generated using random numbers, for example.

The expiration date input portion 83 is an input portion that receives an expiration date of the event code input to the event code input portion 81. The expiration date may be a date or the number of days.

The issuing button 84 provides an instruction to issue an event code and a required number of medium codes to the medium code issuing tool. When an operation is performed by the user on the issuing button 84, the medium code issuing tool issues an event code and a plurality of medium codes based on the values input to the event code input portion 81, the medium number input portion 82, and the expiration date input portion 83. The medium code issuing tool associates the expiration date with the issued event code and generates the table 210 including the medium codes.

The medium code issuing tool outputs medium code images corresponding to the respective issued medium codes.

The medium code issuing tool transmits the generated table 210 to the authentication server 20. The authentication server 20 registers the table 210 transmitted from the PC 71 in the database 21.

The PC 70 acquires the event code from the PC 71 and associates an image and access destination information (URL) with the acquired event code. The PC 70 transmits the event code, the image, and the access destination information associated with one another to the image retrieval device 10.

The image retrieval device 10 analyzes the image transmitted from the PC 70 to extract characteristic information. The image retrieval device 10 registers the extracted characteristic information in the database 11 in a manner associated with the event code and the access destination information transmitted from the PC 70 together with the image.

The PC 71 transmits the medium code images for the number of mediums input to the medium number input portion 82 and issued in association with one event code by the medium code issuing tool to the printing system 60. The PC 70 transmits the image associated with the event code to the printing system 60.

The printing system 60 prints the image transmitted from the PC 70 on the mediums 50 for the number corresponding to the number of medium code images transmitted from the PC 71. The printing system 60 also prints the medium code images on the mediums 50 in an inserting manner. This mechanism can create the mediums 50 with the common image and the respective medium code images 51*a* and 51*b* printed thereon.

Arrangement Examples of the Medium Code Images

Arrangement examples of the medium code images according to the embodiment will be described with reference to FIGS. 12A to 12D. While the medium code images 51*a* and 51*b* are arranged at a pair of opposite corners on the rectangular medium 50 as illustrated in the medium 50 in FIG. 1, for example, the embodiment is not limited thereto. In other words, the medium code images may be arranged at other positions as long as the image retrieval device 10 can identify the image area from which the characteristic information is to be extracted.

Figure 12A:
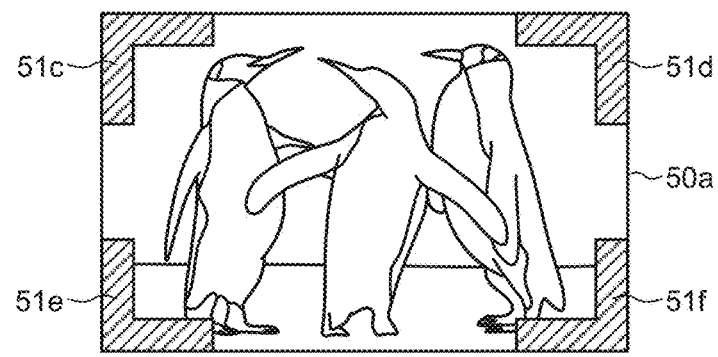
FIGS. 12A to 12D are schematics for explaining arrangement examples of medium code images according to the embodiment.

FIG. 12A illustrates an example where medium code images 51*c*, 51*d*, 51*e*, and 51*f* are arranged at four corners on a medium 50*a*. In the example in FIG. 12A, the medium code images 51*c*, 51*d*, 51*e*, and 51*f* each have a shape extending over two sides and sharing an apex and are arranged at the respective four corners of the medium 50*a*. The image retrieval device 10 detects the medium code images 51*c*, 51*d*, 51*e*, and 51*f*, thereby identifying an area surrounded by the medium code images 51*c*, 51*d*, 51*e*, and 51*f* as the image area from which the characteristic information is to be extracted.

Figure 12B:
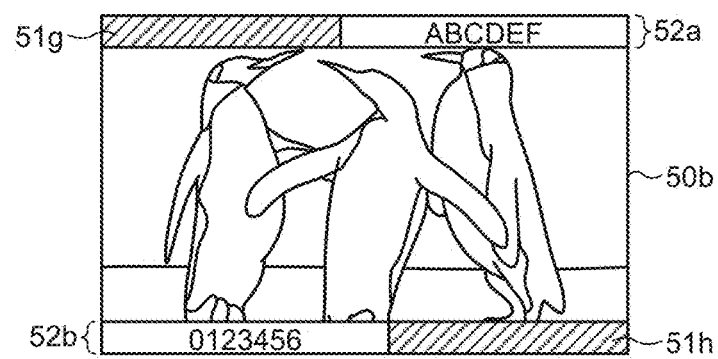

FIG. 12B illustrates an example where medium code images 51*g* and 51*h* are arranged on areas 52*a* and 52*b*, respectively, on which certain information is displayed. The areas 52*a* and 52*b* are arranged at two sides (the upper side and the lower side in the example) opposite to each other on a medium 50*b*.

Figure 12C:
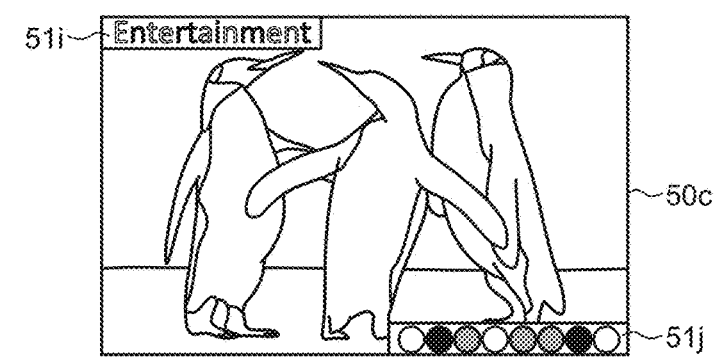
Figure 12D:
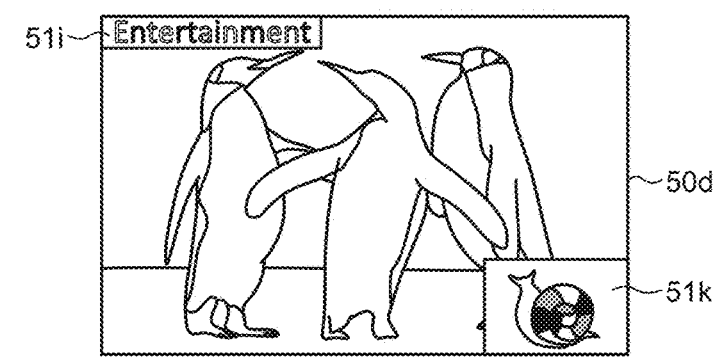

FIGS. 12C and 12D illustrate arrangement examples applicable in a case where Colorbit (registered trademark) is used. Colorbit (registered trademark) indicates information based on transition of colors between adjacent objects on a unicursal trajectory. A large variety of shapes are available for each object.

As illustrated in FIG. 12C, a character string "Entertainment" each character of which is provided with a color is arranged at one end (the upper left corner in the example in FIG. 12C) of opposite corners on a medium 50*c*. The character string "Entertainment" is used as a medium code image 51*i*. As illustrated in FIG. 12C, a medium code image 51*j* is arranged at the other end (the lower right corner) of the opposite corners on the medium 50*c*. The medium code image 51*j* includes objects having shapes different from that of the medium code image 51*i*. The use of Colorbit (registered trademark) makes it possible to arrange both the medium code images 51*i* and 51*j* composed of objects having different shapes on the medium 50*c*.

FIG. 12D illustrates an example where the medium code image 51*i* is arranged at one end (the upper left corner in the example in FIG. 12D) of opposite corners on a medium 50*d* and a medium code image 51*k* is arranged at the other end of the opposite corners. The medium code image 51*i* is composed of a character string similar to that in FIG. 12C. The medium code image 51*k* is composed of objects serving as a figure. The use of Colorbit (registered trademark) as the medium code images makes it possible to add designability to the arrangement of the medium code images.

Images in another format, such as a character string and a barcode, may be used as the medium code images. Also in this case, the medium code images in different formats can be arranged on a single medium 50.

Modification of the Embodiment

While each medium is managed using medium code images resulting from conversion of a medium code into images in the description above, the embodiment is not limited thereto. In a case where no medium code is used, the image retrieval device 10 may perform retrieval based on an image transmitted from the terminal device 40 and return access destination information associated with the image to the terminal device 40. In this case, the use of medium code images can increase the accuracy in the retrieval based on the image.

In a case where Colorbit (registered trademark) is used as the medium code images, the medium code acquiring unit 422 of the terminal device 40 detects the medium code images from the captured image obtained by capturing the medium 50 including the medium code images 51*a* and 51*b*. The function of the medium code acquiring unit 422 is provided to the image retrieval device 10. The image retrieval device 10 detects the medium code images from the captured image transmitted from the terminal device 40 and identifies the image area from which the characteristic information is to be extracted based on the detected medium code images. Thus, the image retrieval device 10 can extract the characteristic information while excluding unnecessary information in the captured image. This mechanism can increase the accuracy in the retrieval based on the captured image.

The medium 50 is not limited to a card-sized medium and may be a medium having a relatively large size, such as a sign and a poster. When the user captures the medium 50 from a position away from the medium 50, the terminal device 40 may cut out and zoom up the image area from which the characteristic information is to be extracted based on the medium code images 51*a* and 51*b* included in the captured image. The cut-out and zoomed-up captured image is transmitted to the image retrieval device 10. As a result, the image retrieval device 10 can easily extract the characteristic information and perform the retrieval with higher accuracy. The image retrieval device 10 may cut out and zoom up the captured image based on the medium code images 51a and 51b.

The medium code images 51a and 51b may possibly be printed on a sheet different from the medium 50, and the sheet may be stuck to the medium 50, for example. In this case, the medium code images 51a and 51b can be added to an already posted sign, poster, or the like.

The terminal device 40 can detect the position, the direction, and the angle of the medium 50 with respect to the terminal device 40 based on the positions and the like of the medium code images 51a and 51b included in the captured image. The terminal device 40 may correct the captured image based on the detected position, direction, and angle. The terminal device 40 may also provide augment reality (AR) representation by arranging prepared object data in the captured image based on the detected position, direction, and angle.

An image or an object used to register the characteristic information in the database 11 may be provided with the medium code images in advance. In this case, the image retrieval device 10 may acquire a captured image by capturing the image or the object and acquire the medium code from the medium code images included in the captured image.

The medium code may include information for identifying a client. The client is a provider that provides a content managed by the content server 30, for example. In this case, the image retrieval device 10 has the database 11 for each client. The terminal device 40 extracts the medium code images 51a and 51b from the captured image to acquire the medium code including the client identification information. The terminal device 40 then transmits the medium code to the image retrieval device 10 together with the captured image. The image retrieval device 10 analyzes the captured image to extract the characteristic information. Based on the extracted characteristic information, the image retrieval device 10 selects and refers to the database 11 corresponding to the client identification information included in the medium code, thereby acquiring the access destination information and the like. Thus, the image retrieval device 10 can prevent false retrieval from a plurality of clients.

An identical image used to extract the characteristic information may possibly be printed on different mediums, such as a plurality of different magazines. In this case, the image is provided with a medium code image including a medium code varying depending on the medium. The terminal device 40 transmits the captured image obtained by capturing the image and the medium code extracted from the medium code image to the image retrieval device 10. Based on the medium code transmitted from the terminal device 40, the image retrieval device 10 can easily determine which medium the characteristic information extracted from the image is to be applied to.

The embodiment is not limited thereto, and a substantially identical image, for example, may be provided with a medium code image including a medium code varying depending on a period. In this case, the image retrieval device 10 can output the access destination information varying depending on a period with respect to the substantially identical image.

In the description above, if the device ID transmitted from the terminal device 40 is not registered in the table 210 at Step S202 in FIG. 7, the authentication server 20 registers the device ID in the table 210. The embodiment is not limited thereto. The authentication server 20 may register, in the table 210, the device ID not registered in the table 210 only when the terminal device 40 accesses the authentication server 20 using the device ID under a predetermined rule, for example.

The authentication server 20, for example, may limit a period for registering a new device ID in the table 210. The authentication server 20, for example, may register a new device ID in the table 210 only when the new device ID is transmitted from a predetermined location. The medium 50 including the image used to extract the characteristic information and the medium code images 51a and 51b may be placed only at a specific location, for example. Alternatively, in a case where the terminal device 40 supports a global positioning system (GPS), the use of positional information acquired by the GPS can determine the location from which the device ID is transmitted. The authentication server 20 may register a new device ID in the table 210 by performing authentication with a pre-distributed password, a separately registered membership number, or the like.

The terminal device 40 may specify a display mode, a calling function, and the like depending on the medium code extracted from the medium code images 51a and 51b detected from the captured image.

The embodiments of present invention can facilitate provision of information based on an image on a medium in units of a user.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
a terminal device; and
an information processing apparatus including,
   a processor configured to register information, the information linking a content to a target image, and
   a memory configured to store a medium code and device information such that the medium code is associated with the device information, the device information identifying the terminal device wherein
the terminal device including a processor configured to,
   obtain a captured image by capturing a subject, the captured image including the target image and a code image extractable from the captured image, the code image being on the target image, the code image being designable based on the target image,
   acquire access destination information from the information processing apparatus based on the captured image, the access destination information indicating a source of the content,
   retrieve, via the source, the content corresponding to the captured image based at least on the medium code acquired from the code image such that, if the medium code is registered to a different terminal device, the processor of the terminal device is unable to retrieve the content from the source, and
   provide, via a display, the content linked to the target image included in the captured image based on the code image extracted from the captured image.

2. The information processing system of claim 1, wherein the processor of the terminal device is configured to obtain the captured image by,
   detecting a presence of the code image in the captured image, and
   obtain the captured image, if the processor of the terminal device detects the presence of the code image.

3. The information processing system of claim 1, wherein the processor of the terminal device is configured to retrieve the content based on the target image and the medium code.

4. The information processing system of claim 1, wherein the code image utilizes transitions among a plurality of colors to form the medium code.

5. A terminal device comprising:
a communication interface configured to communicate via a network with an information processing apparatus, the information processing apparatus including a memory configured to store information, a medium code and device information, the information linking a content to a target image, and the medium code being associated with the device information, the device information identifying the terminal device; and
a processor configured to,
   obtain a captured image by capturing a subject, the captured image including the target image and a code image extractable from the captured image, the code image being on the target image, the code image being designable based on the target image,
   acquire access destination information from the information processing apparatus based on the captured image, the access destination information indicating a source of the content,
   retrieve, via the source, the content corresponding to the captured image based at least on the medium code acquired from the code image such that, if the medium code is registered to a different terminal device, the processor of the terminal device is unable to retrieve the content from the source,
   provide, via a display, the content linked to the target image included in the captured image based on the code image extracted from the captured image.

6. The terminal device of claim 5, wherein the processor is configured to obtain the captured image by,
   detecting a presence of the code image in the captured image, and
   obtain the captured image, if the processor detects the presence of the code image.

7. The terminal device of claim 5, wherein the processor is configured to retrieve the content based on the target image and the medium code.

8. The terminal device of claim 5, wherein the code image utilizes transitions among a plurality of colors to form the medium code.

9. A method for providing a content via a display of a terminal device, the method comprising:
   registering, in a memory of an information processing apparatus, information linking the content to a target image;
   storing, in the memory, a medium code and device information such that the medium code is associated with the device information, the device information identifying the terminal device;
   obtaining, at the terminal device, a captured image by capturing a subject, the captured image including the target image and a code image extractable from the captured image, the code image being on the target image, the code image being designable based on the target image;
   extracting the code image on the target image from the captured image;
   acquiring access destination information from the information processing apparatus based on the captured image, the access destination information indicating a source of the content,
   retrieving, by the terminal device via the source, the content corresponding to the captured image based at least on the medium code acquired from the code image such that, if the medium code is registered to a different terminal device, the terminal device is unable to retrieve the content from the source; and
   providing, via the display, the content linked to the target image included in the captured image based on the code image extracted from the captured image.

10. The method of claim 9, wherein the obtaining comprises:
   detecting a presence of the code image in the captured image, and
   obtaining the captured image, if the detecting detects the presence of the code image.

11. The method of claim 9, wherein the code image utilizes transitions among a plurality of colors to form the medium code.

12. An information processing system, comprising:
an information processing apparatus including a memory configured to store images, content received from a content provider, a medium code and device information such that the medium code is associated with the device information, the device information identifying a terminal device; and
the terminal device including a processor configured to,
   capture an image from a medium, the captured image including a target image framed by a code image, the code image identifying the medium code, acquire access destination information from the information processing apparatus based on the captured image, the access destination information indicating a source of the content,
determine whether the medium code is registered to a different terminal device based on the device information,
retrieve, via the source, the content corresponding to the captured image based at least on the medium code such that, if the medium code is registered to a different terminal device, the processor of the terminal device is unable to retrieve the content from the source, and
provide, via a display, the content corresponding to the captured image.

\* \* \* \* \*